Aug. 29, 1950 R. F. PAULY 2,520,779
STEERABLE SLED
Filed Feb. 2, 1949
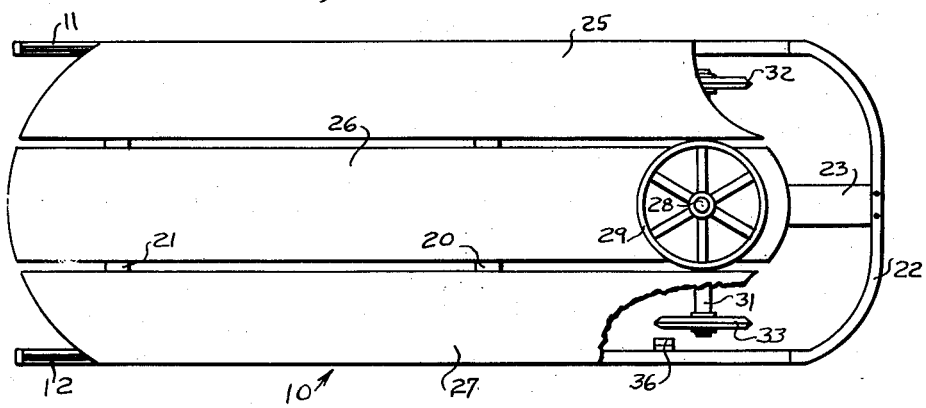
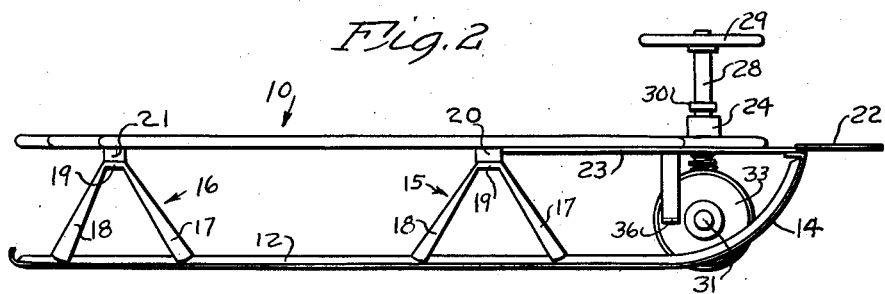
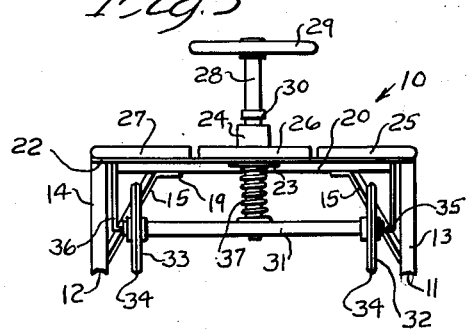
INVENTOR.
ROBERT F. PAULY
BY H.A. Whiteley
Attorney Patented Aug. 29, 1950

2,520,779

UNITED STATES PATENT OFFICE 2,520,779

STEERABLE SLED

Robert F. Pauly, Hopkins, Minn.

Application February 2, 1949, Serial No. 74,071

6 Claims. (Cl. 280—21)

My invention relates to a steerable sled, particularly to sleds used for pleasure by children, and has for its object to provide, in a sled of one piece having one set of continuous runners, a steering wheel mounted at the front of the sled and having an arrangement of one or more rolling wheels contacting the surface over which the sled is moving and adapted to be turned to cause the front of the sled to turn and thereby to steer it.

In practice, steerable sleds are used in the form of what is known as bobsleds, where two sleds, one ahead of the other, have a common seat board extending over both sleds, and the front sled is pivotally connected to the board and its frame support, and is controlled either by a steering wheel and post or by lines or the like. This form of steerable sled known as the bobsled is impractical as a sled for pleasure and amusement to be used by children, and in general requires a strong and skillful older boy or man to operate the pivoted front sled.

Attempts have been made to make a steerable sled which can be used by children, by having the runners formed of some spring material such as steel and fixing some hand-operated member or members to the runners to distort or twist the front part of the runner to steer the sled. Such a sled has not proved satisfactory and must reduce the strength of the runners.

I have thought out a way of steering a child's sled which is very effective for the purpose and which greatly increases the fun and amusement of a child in coasting, as the steering is done in much the same way that steering of an automobile is done.

To do this I use a steering post with a hand wheel for a steering wheel on top of the post, which is rigidly attached to a transverse axle. On the axle is mounted one or more, preferably two, wheels at the ends of the axle. These wheels will have rolling contact with the surface over which the sled is moving. The wheels have a sharp edge on their outer rims to cut into the icy surface where sliding or coasting takes place.

The steering post is mounted for up-and-down movement in a long collar fast on the sled top. It is pushed outwardly by a strong spring so that it is given a yielding engagement with the surface under the sled. Stops prevent swinging the axle and the surface-contacting wheels too far in either direction. This makes it possible for a child to steer a sled safely when going down hill.

The principal object of my invention, therefore, is to provide at the front of a child's sled, having one-piece runners throughout their length, a steering means connected with a steering post on which is a hand-operated steering wheel, said steering means including surface-contacting wheels adapted to be swung with the axle fast on the steering post and situated between the runners of the sled.

It is a further object of my invention to fasten the steering post and the axle of the contact wheels rigidly together so that turning of the steering wheel will turn the post and attached axle and any wheel or wheels mounted thereon.

It is a further object of my invention to mount the steering post for sliding movement in a long collar fast on the top of the sled.

It is a further object of my invention to provide a strong compression spring surrounding the steering post between the underside of the sled top and the steering axle which will operate all the time to push the contacting wheels outwardly against the surface contacted by the wheels.

It is a further object of my invention to provide stops adjacent the steering wheel or the several steering wheels which will prevent turning the axle and the wheels more than a predetermined short distance at any one time.

The full objects and advantages of my invention will appear in connection with the description given in the following specification, and the new features of the invention which produce the aforesaid useful and valuable results will be particularly pointed out in the appended claims.

In the drawings,

Fig. 1 is a plan view of a sled having my steering attachment applied thereto;

Fig. 2 is a side elevation view of the same; and,

Fig. 3 is a front end elevation view of the sled shown in Fig. 2.

As illustrated, a standard sled, designated generally by the numeral 10, has customary runners 11 and 12. Each runner extends the full length of the sled. The runners have front curved portions 13 and 14. As is customary, the runners 11 and 12 constitute a part of the frame of the sled.

Each runner is provided with front bracket members 15 and rear bracket members 16. Each of these bracket members will preferably be formed with legs 17 and 18, preferably united at 19 and sloping outwardly from said point of union to the runners, as best shown in Fig. 2.

To the parts 19 of brackets 16 there are secured supporting members 20 and 21 which extend across the top of the sled under the boards. The ends of the runners are provided with a transverse tie member 22 which bows forwardly, as indicated in Figs. 1 and 2, and is secured at its center to a plate bar 23, which completes the frame of the sled and forms a support for a collar member 24.

A series of boards 25, 26 and 27 are secured to cross members 20 and 21 and complete the sled and furnish the top on which the rider will sit.

Extending vertically through a central round opening in the collar member 24 is a steering post 28 which is free to slide up and down through the opening, and which has thereon an encircling stop 30. The stop 30 limits the downward movement of the steering post 28. The post is also free to turn or rotate.

Fast on the lower end of steering post 28 is an axle 31. In the form shown, this axle extends at right angles to steering post 28 and a considerable part of the distance between the two runners, so its ends are near the runners.

Mounted on bearings on the ends of axle 31, so as to turn freely are a pair of surface-contacting wheels 32 and 33. These wheels are small enough so they will be entirely below the sled top, and each of them is formed with a sharp edge 34.

A pair of stops 35 and 36 are positioned to be contacted by one or the other of wheels 32 and 33, which will prevent swinging the axle 31 too far, and will insure safe steering of the sled by a child at play.

In operation, the sled will be used by children in sliding down inclines and about curves in the usual way, excepting that the child will sit upon the sled with his feet preferably against the curved front rail 22, and, with his hands on the steering wheel 29, he can turn the axle 31 and with it the surface-contacting wheels 32 and 33.

These wheels are yieldingly but firmly held upon the slide surface by a strong spring 37, which surrounds the steering post 28 between the plate bar 23 and the steering axle 24. The spring continuously pushes the wheels 32 and 33 and their sharp edges 34 against the contacted surface over which the sled is sliding.

The sharp edges 34 will cut through that surface, and as the set of wheels is turned one way or the other, will steer and guide the sled to go around curves or be moved back and forth on a wide runway all the time under the control of the child on the sled.

I claim:

1. A steerable sled, comprising an elongated frame including one-piece runners forming a part thereof and a top, a vertical steering post mounted in the top for up-and-down and rotary movements, a hand wheel on the top of said post, an axle rigidly connected at its center to the steering post at right angles thereto and to the runners of a length to bring its ends between and near the runners, a surface-contacting wheel mounted for free rolling movement upon each end part of said axle, and spring means operative upon the steering post to push the same and the axle downwardly, so as to force both wheels upon the contacted surface.

2. A steerable sled, comprising an elongated frame including one-piece runners forming a part thereof and a top, a vertical steering post mounted in the top for up-and-down and rotary movements, a hand wheel on the top of said post, an axle rigidly connected at its center to the steering post at right angles thereto and to the runners of a length to bring its ends between and near the runners, a surface-contacting wheel mounted for free rolling movement upon each end of said axle, and spring means operative upon the steering post to push the same and the axle downwardly so as to force both wheels upon the contacted surface, said contact wheels being formed with a sharp surrounding edge for penetration into the surface.

3. A steerable sled comprising an elongated frame including one-piece runners forming a part thereof and a top, a collar member of substantial length mounted in the top and extending at right angles thereto, a steering post held in said collar for free up-and-down and rotary movements, a hand wheel on the top of the post, an axle rigidly connected at its center to the steering post at right angles thereto and to the runners of a length to bring its ends between and near the runners, a surface-contacting wheel mounted for free rolling movement upon each end part of said axle, and a spring between the collar and the axle surrounding the steering post to push the same and the axle downwardly so as to force both wheels upon the contacted surface.

4. A steerable sled, comprising an elongated frame including one-piece runners forming a part thereof and a top, a vertical steering post mounted in the top and adapted to have up-and-down and rotary movements, a hand wheel on the top of said post, an axle rigidly connected at its center to the steering post at right angles thereto and to the runners of a length to bring is ends between and near the runners, a surface-contacting wheel mounted for free rolling movement upon each end part of said axle, and means on the frame engageable with said wheels when they are turned to limit their turning movement by the axle.

5. A steerable sled, comprising an elongated frame including one-piece runners forming a part thereof and a top, a vertical steering post mounted in the top and adapted to have up-and-down and rotary movements, a hand wheel on the top of said post, an axle rigidly connected at its center to the steering post at right angles thereto and to the runners of a length to bring is ends between and near the runners, a surface contacting wheel mounted for free rolling movement upon each end part of said axle, spring means operative upon the steering post to push the same and the axle downwardly so as to force both wheels upon the contacting surface, and means on the frame engageable with said wheels when they are turned to limit their turning movement.

6. A steerable sled, comprising an elongated frame including one-piece runners forming a part thereof and a top, a vertical steering post mounted in the top and adapted to have up-and-down and rotary movements, a hand wheel on the top of said post, an axle rigidly connected at its center to the steering post at right angles thereto and to the runners of a lengh to bring its ends between and near the runners, a surface-contacting wheel mounted for free rolling movement upon each end part of said axle, and a depending arm on each side of the frame so positioned relative to the wheels on the ends of the axles that said wheels severally will be brought into contact with one or the other of said arms upon turning of the axle to limit that turning.

ROBERT F. PAULY.

REFERENCES CITED

The following references are of record in the file of this patent:

UNITED STATES PATENTS

| Number | Name | Date |
|---|---|---|
| 265,062 | Haldeman | Sept. 26, 1882 |
| 731,925 | Marqua | June 23, 1903 |

FOREIGN PATENTS

| Number | Country | Date |
|---|---|---|
| 82,711 | Switzerland | Oct. 16, 1919 |